United States Patent Office 2,721,881
Patented Oct. 25, 1955

2,721,881

PREPARATION OF N-ALKYL 2-ALKENYL-IDENIMINES

Amelio E. Montagna, Charleston, W. Va., and William C. Bedoit, Jr., St. Louis, Mo., assignors to Union Carbide and Carbon Corporation, a corporation of New York No Drawing. Application October 9, 1952,
Serial No. 313,992

11 Claims. (Cl. 260—566)

This invention relates to the production of N-alkyl 2-alkenylidenimines, and more especially it concerns a novel process for the production of such compounds by the dealcoholization of N-alkyl 3-alkoxyalkylidenimines. The N-alkyl-2-alkenylidenimines are unsaturated compounds that have potential utility as monomers or co-monomers in the production of polymers and copolymers, and in other typical reactions of $\alpha,\beta$-unsaturated organic compounds, such as the Diels-Alder condensation.

Aliphatic Schiff's base derivatives of $\alpha,\beta$-unsaturated aldehydes cannot be prepared directly from the unsaturated aldehydes and the amines. Certain of such derivatives have been made by reacting N-alkyl-2-bromoallyl-amines with sodium amide in liquid ammonia.

According to the present invention, N-alkyl 2-alkenyl-idenimines of the general formula $RCH=CHCH=NR'$, wherein R is hydrogen or a lower alkyl group and R' is an alkyl group, are produced by the dealcoholization of alkoxy Schiff's bases having structures corresponding to the general formula: $RCH(OR^2)CH_2CH=NR'$, wherein R and R' designate the radicles hereinbefore mentioned, and $R^2$ designates an alkyl group, and preferably one having from 1 to 4 carbon atoms. The dealcoholization of the alkoxy Schiff's base preferably is conducted in the presence of an alkaline catalyst such as an alkali metal alcoholate, and in the presence of a high boiling inert solvent for the alcoholate and alkoxy Schiff's base. Conveniently, the solvent is the high boiling alcohol corresponding to the alkali metal alcoholate used as catalyst, although other solvents boiling above the boiling points of the alcohol ($R^2OH$) formed in the dealcoholization and the desired N-alkyl 2-alkenylidenimines can be used effectively.

The dealcoholization of the alkoxy Schiff's base is best effected by slowly adding the crude dry alkoxy Schiff's base to a boiling solution of an alkaline catalyst in a high-boiling inert solvent for the starting material and catalyst, while maintaining the reaction mixture under subatmospheric pressure, and withdrawing the vaporous reaction products containing the N-alkyl-2-alkenyliden-imine from the reaction mixture substantially as rapidly as formed. The withdrawn vapors, which also contain the alcohol produced in the dealcoholization, are condensed in a receiver in the presence of a small amount of a polymerization inhibitor for the N-alkyl-2-alkenyl-idenimine, preferably an alkali metal alcoholate, e. g., sodium or potassium methylate or ethylate.

The condensate then is fractionally distilled under subatmospheric pressure, and the alcohol fraction and the subsequent fraction containing the desired N-alkyl-2-akenylidenimine are separately recovered.

While the sodium and potassium alcoholates derived from the high boiling primary alcohols used as solvents are the preferred catalysts, other strongly alkaline catalysts, such as the sodium and potassium metals, their oxides and hydroxides, and alcoholates of alcohols other than the solvent alcohol, can be used. All of these, of course, lead to the formation of the alcoholate of the solvent alcohol upon heating of the solvent-catalyst mixture.

The preferred solvents are the high-boiling primary monohydric and polyhydric alcohols and ether alcohols, such as the alkoxyethoxyethanols and the alkoxypoly-ethoxyethanols having 1 to 4 carbon atoms in the said alkoxy group, ethylene glycol, diethylene glycol, and higher polyethylene glycols, octanol-1, decanol-1, dodecanol-1 and hexadecanol-1.

Many of the N-alkyl-2-alkenylidenimines made by this invention are colorless liquids with extremely potent lachrymatory action and disagreeable odor. When pure these compounds are reasonably stable, but in the impure state they polymerize readily with evolution of heat. However, this polymerization tendency is inhibited by the presence of a small amount of any alkali metal alcoholate. The usual polymerization inhibitors such as hydroquinone are not effective.

The N-alkyl 3-alkoxyalkylidenimines used as starting materials are prepared by known processes for preparing aliphatic Schiff's bases. One preferred method consisted in slowly adding a molar equivalent of a 3-alkoxyalkanal to a monoalkylamine at a temperature near or below 0° C., and then removing the water of reaction by adding potassium hydroxide flakes to the reaction mixture. The mixture stratifies, and the layer containing the organic liquid is separated and treated with solid drying agents such as potassium hydroxide, calcium oxide, calcium sulphate, and the like.

The thus dried crude product can be used in the dealcoholization process without further purification.

The course of the principal dealcoholization reaction can be represented by the equation:

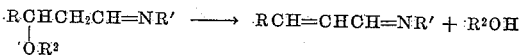

wherein R is hydrogen or a lower alkyl group having 1 to 5 carbon atoms, and R' and $R^2$, respectively represent alkyl groups.

The reaction producing the N-alkyl 3-alkoxyalkyl-idenimines to be dealcoholized can be represented by the equation:

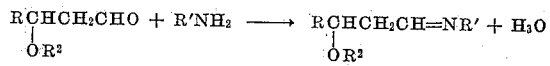

The 3-alkoxyaldehydes may be prepared by known procedures involving the reaction of alcohols of the type $R^2OH$ with $\alpha,\beta$-unsaturated aldehydes of the type $RCH=CHCHO$, according to the equation:

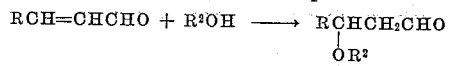

The following examples will serve to illustrate certain modifications of the invention:

Example 1

In a still kettle, provided with a short packed column, a feeding funnel, and means for maintaining a vacuum therein, and having connected therewith a condenser and receiver, 198 grams of a 22% solution of the potassium alcoholate of beta-(beta-butoxyethoxy) ethanol in beta-(beta-butoxyethoxy) ethanol was heated to boiling (140° C.) under a pressure of 50. mm. of mercury, and 487 grams (3.1 mols) of crude N-butyl 3-ethoxypropylideni-mine was added gradually over a period of 2 hours while the reaction mixture was maintained at the boiling temperature under approximately 50. mm. of mercury pressure. The evolved decomposition products, amounting to 397 grams, were withdrawn as formed and condensed in a receiver containing 5. grams of sodium methylate serving as polymerization inhibitor.

Upon redistillation of this distillate under subatmospheric pressure, after separating a fraction containing ethanol and low boiling products, a fraction of 203 grams of N-butyl allylidenimine was secured, which distilled at 42.8° to 43.8° C. at 30. mm. of mercury pressure, and had a purity of 91%. This represented a yield of 54%. A second fractional redistillation of the last-named fraction yielded a purified product having a purity of 95% boiling at 43.8°–44.2° C. under 30 mm. of mercury pressure and at 129° C. under atmospheric pressure, and having $n_D^{24} = 1.4385$, and a specific gravity at 23° C. of 0.774. It analyzed:

|              | Theoretical | Obtained |
|--------------|-------------|----------|
| C, Percent   | 75.6        | 75.4     |
| H, Percent   | 11.8        | 12.3     |
| N, Percent   | 12.6        | 11.8     |

The N-butyl-3-ethoxypropylidenimine starting material was prepared by slowly introducing into a flask containing 292 grams (4 mols) of mono-n-butylamine, cooled to −5° C., 408 grams (4 mols) of 3-ethoxypropionaldehyde during a period of 2 hours while maintaining the reaction mixture between −10° C. and 0° C. Agitation was continued for 30 minutes after complete addition of the aldehyde, and then 50 grams of solid potassium hydroxide was added. After dissolution of the latter the mixture stratified, and the lower aqueous layer was removed. The organic layer was stored overnight at 0° C. in a flask with 50 grams of potassium hydroxide, after which the product was dried by stirring with 30 grams of calcium oxide for 2 hours. A 94% yield of crude N-butyl 3-ethoxypropylidenimine was secured.

Example 2

Following the general procedure described in Example 1, 460 grams (3.56 mols) of N-ethyl 3-ethoxy-propylidenimine was gradually added during 2 hours to 208 grams of a boiling solution consisting of 21% of the potassium alcoholate of beta-(beta-butoxyethoxy) ethanol in beta-(beta-butoxyethoxy) ethanol maintained under 200 mm. of mercury pressure. Fractional redistillation under vacuum of the reaction products withdrawn and condensed as formed yielded 117. grams of N-ethyl allylidenimine, which boiled at 2° to 6° C. under 30 mm. of mercury pressure, had a purity of 79%, and $n_D^{22} = 1.4250$. This represented a 31% yield of the desired product.

The N-ethyl 3-ethoxypropylidenimine starting material was prepared by reacting 251 grams (4 mols) of aqueous 72% monoethylamine and 408 grams (4 mols) of 3-ethoxypropionaldehyde and drying the reaction product with potassium hydroxide and calcium oxide in the general manner described in Example 1.

Example 3

Following the general procedure described in Example 1, 440 grams (3.82 mols) of crude N-methyl 3-methoxybutylidenimine was dealcoholized by gradually adding the same during 2.5 hours to 198 grams of a boiling solution consisting of 22% of the potassium alcoholate of beta-(beta-butoxyethoxy) ethanol in beta-(beta-butoxyethoxy) ethanol maintained under 50 mm. of mercury pressure. Fractional redistillation under vacuum of the reaction products withdrawn as rapidly as formed during the dealcoholization reaction yielded 91.2 grams (29% yield) of N-methyl crotylidenimine, boiling at 55°–56° C. under a pressure of 200 mm. of mercury, and having a $n_D^{28°} = 1.4528$, and a purity of 86%.

The N-methyl 3-methoxybutylidenimine starting material was made in the general manner described in Example 1 by reacting at a temperature below −30° C. 114 grams (3.68 mols) of monomethylamine and 375 grams (3.68 mols) of 3-methoxybutyraldehyde, and drying the reaction products with potassium hydroxide and a porous anhydrous calcium sulphate.

Example 4

Following the general procedure described in Example 1, 424 grams (3.29 mols) of N-ethyl 3-methoxybutylidenimine was dealcoholized by gradually adding the same during 2 hours to 99 grams of a boiling solution consisting of 22% of the potassium alcoholate of beta-(beta-butoxyethoxy) ethanol in beta-(beta-butoxyethoxy) ethanol maintained under a pressure of 100 mm. of mercury.

Fractional redistillation under vacuum of the reaction products withdrawn and condensed as rapidly as formed during the dealcoholization reaction yielded 181 grams (1.87 mols), a 57% yield, of N-ethyl crotylidenimine having the following properties: Boiling point 77.5° C. at 200 mm. of mercury pressure;

$$D\frac{26°}{20°} = 0.779$$

$n_D^{21°} = 1.4550$; purity 99.5%; analysis:

|                   | Theoretical | Obtained |
|-------------------|-------------|----------|
| molecular weight  | 97.0        | 97.5     |
| Carbon, Percent   | 74.1        | 74.1     |
| hydrogen, Percent | 11.4        | 11.6     |
| nitrogen, Percent | 14.4        | 13.6     |

The N-ethyl 3-methoxybutylidenimine starting material was prepared by reacting 251 grams (4 mols) of monoethylamine and 408 grams (4 mols) of 3-methoxybutyraldehyde, and drying the reaction product with potassium hydroxide and porous anhydrous calcium sulfate, in the general manner described in Example 1.

In similar manner, the dealcoholization of the N-alkyl-3-alkoxypentylidenimines yield the corresponding N-alkyl 3-ethylallylidenimines; the N-alkyl-3-alkoxyhexylidenimines yield corresponding N-alkyl-3-propylallylidenimines; and the N-alkyl-3-alkoxyoctylidenimines yield corresponding N-alkyl-3-pentylallylidenimines. Thus, N-ethyl 3-propylallylidenimine can be made by dealcoholizing N-ethyl 3-methoxyhexylidenimine, which in turn is made by reacting monoethylamine and a 3-alkoxyhexaldehyde such as 3-methoxyhexaldehyde; and N-2-ethylhexyl-3-ethylallylidenimine can be made by dealcoholizing N-2-ethylhexyl 3-methoxypentylidenimine, formed by reacting mono-2-ethylhexylamine and a 3-alkoxypentanal such as 3-methoxypentanal.

It is not essential that the dealcoholization reaction be conducted at the boiling point of the solvent so long as a reaction temperature is maintained at which the reaction products when formed are converted to the vapor state and readily removed from the reaction mixture as formed under the vacuum imposed. For convenience of control, it is preferred to operate at or near the boiling point of the solution.

The invention is susceptible of modification within the scope of the appended claims.

We claim:

1. Process for producing N-alkyl-2-alkenylidenimines, which comprises heating an N-alkyl-3-alkoxyalkylidenimine in the presence of an alkaline catalyst and of an inert high-boiling solvent for the catalyst and the said N-alkyl-3-alkoxyalkylidenimine, under conditions of pressure and temperature at which the resultant reaction products are in the vapor state, separating such vapors from the reaction mixture as formed, condensing the vapors, and recovering from the condensate the N-alkyl-2-alkenylidenimine present therein.

2. Process as defined in claim 1 wherein the vapors separated from the reaction mixture are condensed in the presence of an alkali metal alcoholate.

3. Process for producing N-alkyl-2-alkenylidenimines, which comprises heating an N-alkyl-3-alkoxyalkylidenimine in the presence of an alkaline catalyst and of an inert high-boiling primary alcohol which is a solvent for the catalyst and the said N-alkyl-3-alkoxyalkylidenimine, under conditions of pressure and temperature at which the resultant reaction products are in the vapor state, separating such vapors from the reaction mixture as formed, condensing the vapors, and recovering from the condensate the N-alkyl-2-alkenylidenimine present therein.

4. Process for producing N-alkyl-2-alkenylidenimines, which comprises heating an N-alkyl-3-alkoxyalkylidenimine in the presence of an alkali metal alcoholate and a beta-(beta-alkoxyethoxy) ethanol as solvent, under conditions of pressure and temperature at which the resultant reaction products are in the vaporous state, separating such vapors from the reaction mixture as formed, condensing the separated vapors, and recovering from the condensate the N-alkyl-2-alkenylidenimine present therein.

5. Process for producing N-alkyl-2-alkenylidenimines, which comprises heating an N-alkyl-3-alkoxyalkylidenimine in the presence of an alkali metal alcoholate of a beta-(beta-alkoxyethoxy) ethanol and a solvent comprising a beta-(beta-alkoxyethoxy) ethanol, under conditions of pressure and temperature at which the resultant reaction products are in the vaporous state, separating such vapors from the reaction mixture as formed, condensing the separated vapors, and recovering from the condensate the N-alkyl-2-alkenylidenimine present therein.

6. Process for producing N-alkyl-2-alkenylidenimines from a 3-alkoxyalkanal, which comprises slowly adding successive portions of a 3-alkoxyalkanal to a monoalkylamine at a temperature within the range between about −10° C. and about 0° C., dehydrating the resultant crude N-alkyl-3-alkoxyalkylidenimine, adding successive amounts of the dehydrated material to a solution of an alkaline catalyst in a high-boiling primary alcohol which is an inert solvent for the catalyst and the N-alkyl-3-alkoxyalkylidenimine, under conditions of temperature and pressure at which the resultant reaction products are vapors, withdrawing the vaporous reaction products as formed, condensing the withdrawn vapors, and recovering from the condensate the N-alkyl-2-alkenylidenimine present therein.

7. Process as defined in claim 6 wherein the alkoxyalkanal is a 3-alkoxypropionaldehyde.

8. Process as defined in claim 6 wherein the alkoxyalkanal is a 3-alkoxybutyraldehyde.

9. Process as defined in claim 6, wherein the alkoxyalkanal is a 3-alkoxyhexaldehyde.

10. A composition of matter comprising (1) an N-alkyl-2-alkenylidenimine of the formula $$R \cdot CH=CHCH=NR'$$

wherein R designates a group selected from the class consisting of hydrogen and the alkyl groups having from 1 to 5 carbon atoms and R' is an akyl group, and (2) as a polymerization inhibitor an alkali metal alcoholate.

11. Process for producing N-alkyl 2-alkenylidenimines, which comprises heating an N-alkyl 3-alkoxyalkylidenimine of the formula $$RCH(OR^2)CH_2CH=NR'$$

wherein R designates a member of the class consisting of hydrogen and the lower alkyl radicals; R' represents an alkyl radical; and $R^2$ designates an alkyl group of not more than four carbon atoms, in the presence of an alkaline catalyst and of an inert high-boiling solvent for the catalyst and the N-alkyl 3-alkoxyalkylidenimine under conditions of pressure and temperature at which the resultant reaction products are in the vapor state, separating such vapors from the reaction mixture as formed, condensing the vapors, and recovering from the condensate the N-alkyl 2-alkenylidenimine present therein.

References Cited in the file of this patent

UNITED STATES PATENTS

| 1,757,945 | Sebrell | May 6, 1930 |
| 2,181,454 | Guinot | Nov. 28, 1939 |
| 2,319,848 | Clark et al. | May 25, 1943 |
| 2,498,419 | Haury | Feb. 21, 1950 |
| 2,692,283 | Haury | Oct. 19, 1954 |

FOREIGN PATENTS

| 365,214 | Great Britain | Jan. 21, 1932 |

OTHER REFERENCES

Tiollais: "Comptes Rendus," vol. 224 (1947), pp. 1116–18.